(12) United States Patent
Li et al.

(10) Patent No.: US 7,010,228 B2
(45) Date of Patent: Mar. 7, 2006

(54) OPTICAL ADD-DROP MULTIPLEXER

(75) Inventors: David Li, Sunnyvale, CA (US); Hong Liang Cui, Basking Ridge, NJ (US)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 670 days.

(21) Appl. No.: 10/052,809

(22) Filed: Nov. 2, 2001

(65) Prior Publication Data

US 2004/0208581 A1    Oct. 21, 2004

(51) Int. Cl.
*H04J 14/02* (2006.01)
(52) U.S. Cl. .......................................... 398/83; 398/96
(58) Field of Classification Search ................ 398/82, 398/83, 84, 85, 86, 87, 88, 50, 55, 56, 96
See application file for complete search history.

(56) References Cited

U.S. PATENT DOCUMENTS

| | | | | |
|---|---|---|---|---|
| 3,506,834 A | * | 4/1970 | Buchsbaum et al. ........ | 398/101 |
| 4,274,706 A | * | 6/1981 | Tangonan .................... | 385/37 |
| 4,744,618 A | * | 5/1988 | Mahlein ....................... | 385/37 |
| 5,233,453 A | * | 8/1993 | Sivarajan et al. ............. | 398/55 |
| 5,510,920 A | * | 4/1996 | Ota .............................. | 398/63 |
| 6,198,864 B1 | * | 3/2001 | Lemoff et al. ................ | 385/47 |
| 6,434,299 B1 | * | 8/2002 | Yudin et al. .................. | 385/37 |
| 6,707,959 B1 | * | 3/2004 | Ducellier et al. ............. | 385/17 |

* cited by examiner

*Primary Examiner*—Christina Y. Leung
(74) *Attorney, Agent, or Firm*—Wei Te Chung

(57) ABSTRACT

An optical add-drop multiplexer comprises an optical switch (10) for selection of a desired wavelength channel to be extracted, a pre-processing channel assembly (20), an optical reflector (50), an optical extractor (60), a post-processing channel assembly (30), and an optical coupler (40) aligned with the post-processing channel assembly. The pre-processing channel assembly transmits a multiplexed signal stream containing a plurality of channels. The optical reflector directs light rays emitted from the pre-processing channel assembly into the optical extractor. The optical extractor comprises a narrow bandpass filter (62) that allows a desired channel to pass therethrough and reflects other unextracted channels. The desired channel can be dropped by switching to a corresponding output port of the optical switch. The optical reflector directs light rays reflected from the optical extractor to the post-processing channel assembly. The optical coupler combines the unextracted channels and an insertion channel.

19 Claims, 1 Drawing Sheet

$\lambda_0 = 1550$ nm
$\lambda_1 = 1547.6$ nm
$\lambda_2 = 1545.2$ nm
$\lambda_3 = 1542.8$ nm
$\lambda_4 = 1540.4$ nm

OPTICAL ADD-DROP MULTIPLEXER

BACKGROUND OF THE INVENTION

1. Field of the Invention

The present invention relates to optical add-drop multiplexers, and particularly to an optical add-drop multiplexer incorporating a paraboloid reflector.

2. Description of Related Art

A n optical add-drop multiplexer (OADM) is used in a node of a wavelength division multiplexing (WDM) communications network. The OADM extracts a channel containing information conveyed to the node from a multiplexed stream, and allows remaining channels to pass through unaltered. The OADM is also needed to add a new channel, which transports information generated within the node to the multiplexed stream. In practice, the dropped channel and the added channel are allocated the same wavelength, to simplify network management. A user can readily associate the dropped and added channels with the concerned node. An other application of OADMs is in routing nodes of reconfigurable optical networks. Certain information streams can be re-routed according to changed traffic conditions, or to remedy a failure downstream of the connected node.

The OADM can be considered as a four-port device, with two ports for the input and output of the overall stream and two ports for the input and output of an individual channel. The ports related to the overall stream are hereinafter called the input port and the output port, and the ports related to the individual channel are hereinafter called the drop port and the add port.

Nowadays, OADMs which can add and drop a desired channel in a multiplexed stream containing several wavelength channels are becoming more and more popular for use in WDM networks. Presently, non-absorbing interference filters are used to manufacture such OADMs. These filters comprise a series of dielectric layers. The layers have refractive indices and thicknesses such that the filters transmit a certain portion of the spectrum of incident rays, and reflect the remaining portion. A simple inclined interference filter placed in a suitable system for collimating and re-focusing the optical beams can directly perform the functions required by a WDM device. A first face of the filter receives the multiplexed stream. The first face reflects all wavelengths except the one to be extracted, which exits an opposite second face of the filter. The first face also receives the wavelength to be inserted, which is then transmitted through the filter and is combined with the multiplexed stream. However, a WDM device using a single filter has a poor reflection extinction ratio. A fraction of the signal of the extracted channel is transferred to the output port, and interferes with the signal having the same wavelength that is added at the add port. This interference can seriously degrade the performance of the system. Moreover, tuning of the filter is difficult. Variation of the inclination of the filter is required to vary the transmitted bandwidth, but such variation also causes angular displacement of the reflected beam relative to an optical collecting device of the system.

U.S. Pat. No. 5,812,291 discloses an optical tunable add-drop multiplexer comprising a pair of identical interference filters. One of the filters carries out the drop function, and the other filter carries out the add function. The two filters are arranged in parallel planes, and are secured to opposite faces of a transparent body. Therefore, the stream comprising a plurality of channels undergoes reflection by both filters when it travels through the device. The transparent body is mounted on a support which is hinged on an axis. The axis is parallel to the planes of the filters and passes through the barycenter of the multiplexer. The body is rotatable in either direction to vary the tuning wavelength of the filters. Unfortunately, the structure of the multiplexer is complicated. In addition, wavelength selection is troublesome and inaccurate, due to the method of mechanical tuning.

SUMMARY OF THE INVENTION

In view of the above, an object of the present invention is to provide an optical add-drop multiplexer which can easily drop any wavelength channel as desired.

Another object of the present invention to provide an optical add-drop multiplexer which allows accurate, easy and instantaneous selection of a desired channel.

In order to achieve the objects set out above, an optical add-drop multiplexer in accordance with the present invention comprises an optical switch for selection of a desired wavelength channel to be extracted, a pre-processing channel assembly, an optical reflector, an optical extractor, a post-processing channel assembly, and an optical coupler aligned with the post-processing channel assembly.

The pre-processing channel assembly transmits a multiplexed signal stream containing a plurality of channels. The optical reflector directs light rays emitted from the pre-processing channel assembly into the optical extractor. The optical extractor comprises a narrow bandpass filter that allows a desired channel to pass therethrough and reflects other unextracted channels. The desired channel can be dropped by switching to a corresponding output port of the optical switch. The optical reflector directs light rays reflected from the optical extractor to the post-processing channel assembly. The post-processing channel assembly transmits the unextracted channels to the optical coupler. The optical coupler combines the unextracted channels and an insertion channel.

Other objects, advantages and novel features of the invention will become more apparent from the following detailed description when taken in conjunction with the accompanying drawings, in which:

DETAILED DESCRIPTION OF PREFERRED EMBODIMENT

Reference will now be made to the drawings to describe the present invention in detail.

Figure 1:
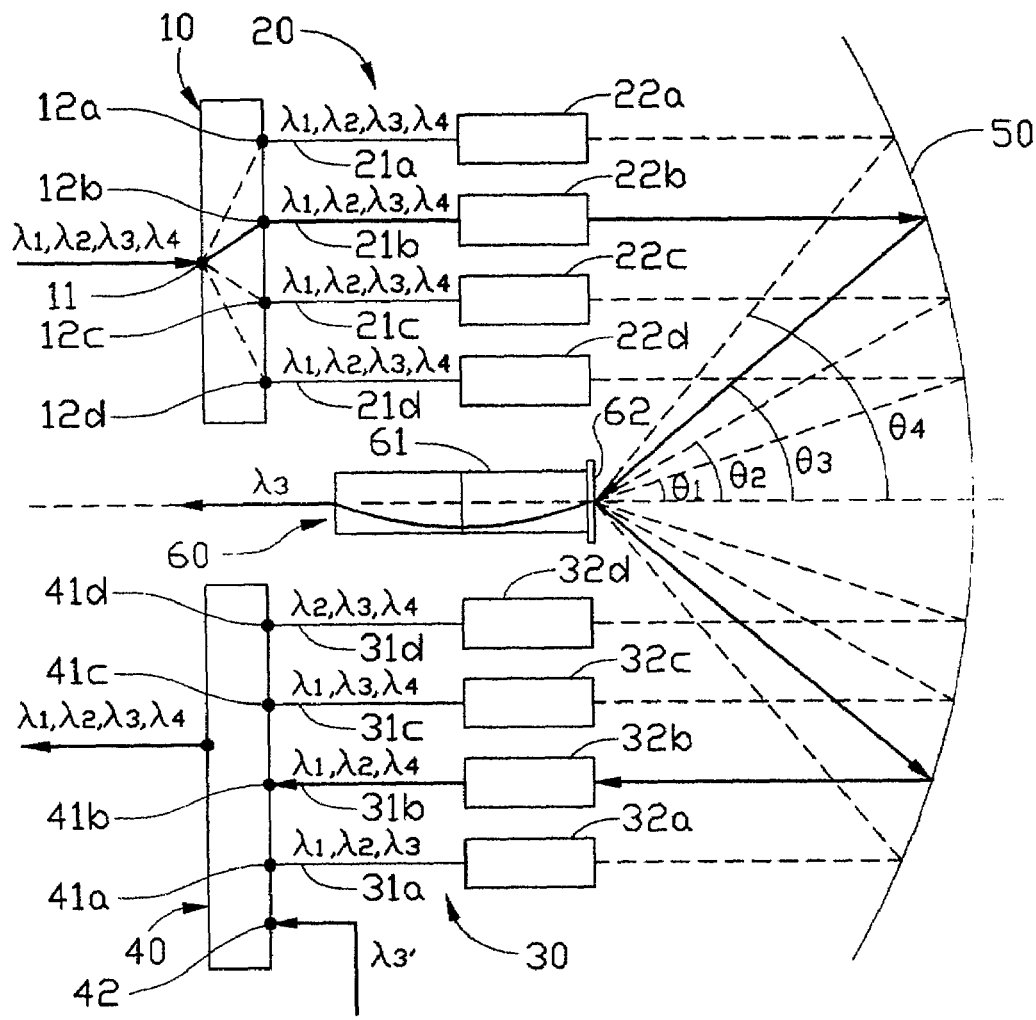
FIG. 1 is a schematic cross-sectional view of an optical add-drop multiplexer according to a preferred embodiment of the present invention.

FIG. 1 shows an optical add-drop multiplexer (OADM) in accordance with a preferred embodiment of the present invention. The OADM comprises an optical switch 10, a pre-processing channel assembly 20, a post-processing channel assembly 30, an optical coupler 40, an optical reflector 50, and an optical extractor 60.

The optical switch 10 comprises an input port 11 for inputting a multiplexed stream containing four different wavelength channels: $\lambda_1, \lambda_2, \lambda_3, \lambda_4$. The optical switch 10 also comprises four output ports 12a, 12b, 12c, 12d optically connected with the pre-processing channel assembly 20. The pre-processing channel assembly 20 comprises four optical fibers 21a, 21b, 21c, 21d, and four collimators 22a, 22b, 22c, 22d. Each optical fiber 21a, 21b, 21c, 21d has a first end connected with a corresponding output port 12a, 12b, 12c, 12d of the optical switch 10, and a second end connected with a corresponding collimator 22a, 22b, 22c, 22d. Each collimator 22a, 22b, 22c, 22d comprises a GRIN lens for outputting collimated light rays. Alternatively, an aspherical lens can be used instead of a GRIN lens. The post-processing channel assembly 30 comprises four optical fibers 31d, 31c, 31b, 31a respectively aligned with four condensers 32d, 32c, 32b, 32a.

The optical reflector 50 is a concave mirror reflector having an appropriate curvature for directing light rays emitted from the pre-processing channel assembly 20 into the optical extractor 60, and for directing light rays reflected from the optical extractor 60 to the post-processing channel assembly 30. FIG. 1 highlights a light ray emitted from the collimator 22b of the pre-processing channel 20 assembly 20 being precisely reflected by the optical reflector 50 to the optical extractor 60, and a light ray reflected from the optical extractor 60 being precisely reflected by the optical reflector 50 to the optical condenser 32b of the post-processing channel assembly 40. The optical reflector 50 may comprise a glass body or other suitable material. A paraboloid surface of the glass body is precisely formed to serve as a reflecting surface. A high reflective coating is applied on the paraboloid surface of the glass body.

The optical extractor 60 is for dropping a desired wavelength channel, and comprises a ½ pitch graded index (GRIN) lens 61 and a narrow bandpass filter 62. The bandpass filter 62 is attached to the GRIN lens 61, for passing the desired wavelength channel therethrough and reflecting other unextracted channels to the optical reflector 50. The GRIN lens 61 is for receiving the light ray of the desired wavelength channel from the bandpass filter 62, and directing that light ray to an output fiber (not labeled). The GRIN lens 61 can be substituted with one or more aspherical lenses.

A numerical aperture of the GRIN lens 61 employed in the present invention is about 0.47. Thus, a corresponding acceptance cone half-angle θ is about 28 degrees. A passable wavelength λ is a function of the angle of incidence θ of an incident light ray as follows:

$$\lambda = \lambda(\theta) = \lambda_0 [1 - n_0^2 \sin^2\theta / n_{\mathit{eff}}^2]^{1/2}$$

wherein $n_0$ represents the refractive index of air;

$n_{\mathit{eff}}$ represents an effective refractive index of the bandpass filter 62; and θ represents the angle of incidence of a light ray with respect to the bandpass filter 62.

Therefore only a particular wavelength can pass through the bandpass filter 62, according to the angle of incidence of the light ray. When the angle of incidence is increased, the wavelength of the passable channel is decreased.

In the preferred embodiment, the reference wavelength $\lambda_0$ is 1550 nm. Thus, a maximum center wavelength shift $\Delta\lambda$ is as follows:

$$\Delta\lambda = \lambda - \lambda_0$$

$$= \lambda_0 [1 - n_0^2 \sin^2\theta / n_{\mathit{eff}}^2]^{1/2} - \lambda_0$$

-continued $$= \lambda_0 \{[1 - n_0^2 \sin^2\theta / n_{\mathit{eff}}^2]^{1/2} - 1\}$$

$$= 1550\{\sqrt{(-\sin^2 28°/1.6578^2)} - 1\}$$

$$= -63.5 \text{ nm}$$

assuming $n_0 = 1$, $n_{\mathit{eff}} = 1.6578$ and θ=28°.

Figure 2:
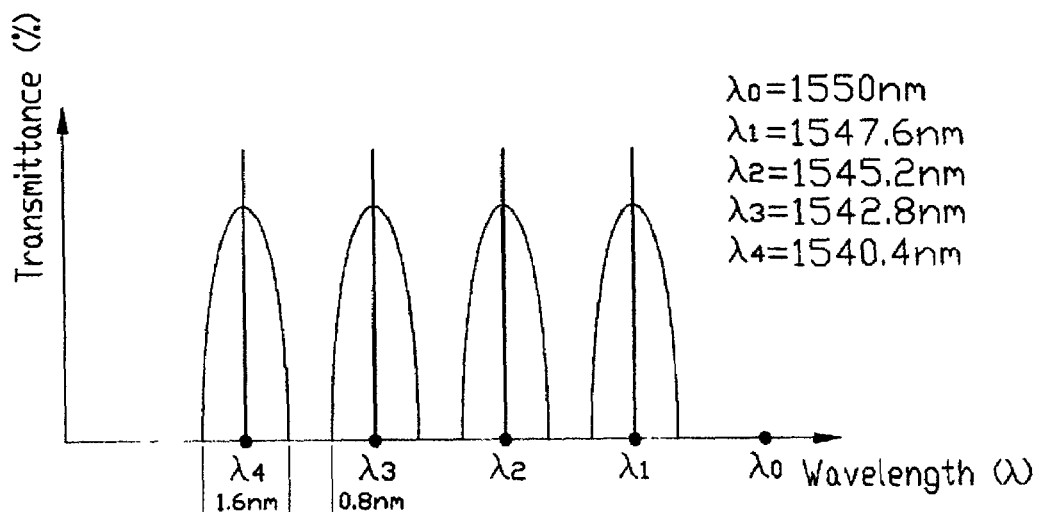
FIG. 2 is a graph showing channel configuration of the optical add-drop multiplexer of FIG. 1.

Referring to FIG. 2, the preferred embodiment should comply with International Telecommunications Union-Telecommunication Standardization Sector (ITU-T) grid standards. Accordingly, the channel width of a 4-channel 200 GHz OADM according to the present invention is set as 2.4 nm. This contains two half-separate bands of 1.6 nm and a guard band of 0.8 nm. Thus, the total bandwidth is 4×2.4=9.6 nm. The angle of incidence of each passable wavelength channel is:

$$\theta = \sin^{-1}[n_{\mathit{eff}}/n_0 (1 - \lambda^2/\lambda_0^2)^{1/2}]$$

Hence, if the reference wavelength $\lambda_0$ is 1550 nm, the central wavelength of each channel is as follows:

$\lambda_1 = \lambda_0 - 2.4$ nm=1547.6 nm $\lambda_2 = \lambda_1 - 2.4$ nm=1545.2 nm $\lambda_3 = \lambda_2 - 2.4$ nm=1542.8 nm $\lambda_4 = \lambda_3 - 2.4$ nm=1540.4 nm Accordingly, the exact angular position of each wavelength channel is as follows:

$\theta_1 = \sin^{-1}[1.6578(1 - 1547.6^2/1550^2)^{1/2}] = 5.3°$ $\theta_2 = \sin^{-1}[1.6578(1 - 1545.2^2/1550^2)^{1/2}] = 7.5°$ $\theta_3 = \sin^{-1}[1.6578(1 - 1542.8^2/1550^2)^{1/2}] = 9.2°$ $\theta_4 = \sin^{-1}[1.6578(1 - 1540.4^2/1550^2)^{1/2}] = 10.6°$ Referring back to FIG. 1, the curvature of the concavity of the optical reflector 50 is formed to precisely reflect the light rays collimated by the pre-processing channel assembly 20 to the bandpass filter 62 according to the exact angle of incidence of each passable wavelength channel, and to precisely reflect the light rays reflected by the band pass filter 62 to the corresponding condensers of the post-processing channel assembly 30.

The coupler 40 comprises five input ports 41d, 41c, 41b, 41a, 42, and an output port (not labeled) connected with an output fiber (not labeled) for outputting the multiplexed stream. The input ports 41d, 41c, 41b, 41a correspond to the post-processing channel assembly 30, and the input port 42 is for insertion of desired wavelength channels. The optical fibers 31d, 31c, 31b, 31a of the post-processing channel assembly 30 are respectively aligned with the input ports 41d, 41c, 41b, 41a, and with the optical condensers 32d, 32c, 32b, 32a.

The pre-processing and post-processing channel assemblies 20, 30 can also be respectively integrally formed on an optical substrate, or further incorporated with the optical switch 10, the optical reflector 50 and the optical coupler 40. This reduces the size of the OADM of the present invention.

The operational principles of the OADM of the preferred embodiment are shown in FIG. 1. Actual light paths are represented by solid lines. Other light paths traced if the switch 10 is switched to other desired channels are represented by broken lines. An original signal stream contains four different wavelength channels $\lambda_1, \lambda_2, \lambda_3, \lambda_4$. To extract channel $\lambda_3$, the optical switch 10 is switched to output port 12b. The original signal stream is thus directed to the optical fiber 12b, and collimated by the collimator 22b. The collimated light rays are emitted from the pre-processing channel assembly 20, and are reflected by the optical reflector 50 to the bandpass filter 62. The angle of incidence $\theta=\theta_3$, which corresponds to the passable wavelength $\lambda_3$. The other unextracted channels $\lambda_1, \lambda_2, \lambda_4$ are reflected by the bandpass filter 62, then reflected by the optical reflector 50, and then collected by the condenser 32b of the post-processing channel assembly 30. The insertion channel $\lambda_3'$ and the unextracted channels $\lambda_1, \lambda_2, \lambda_4$ are coupled into the output fiber (not labeled) by the optical coupler 40.

An OADM in accordance with an alternative embodiment of the present invention complies with the ITU-T grid standard of 100 GHz. Such OADM can accommodate about 40 channels, where each channel comprises a 0.8 nm separate band and a 0.8 nm guard band. The structure of such OADM is similar to that of the OADM in accordance with the preferred embodiment as described above. Similarly, other alternative embodiments of the OADM of the present invention can be configured according to the above-mentioned operational principles. For example, other alternative embodiments having a variety of desired channel interval widths can be configured.

While the preferred embodiment in accordance with the present invention has been shown and described in detail, equivalent modifications and changes known to persons skilled in the art according to the spirit of the present invention are considered within the scope of the present invention as defined in the appended claims.

The invention claimed is:

1. An optical add-drop multiplexer comprising:
    an optical switch having an input port for inputting a multiplexed signal stream;
    a first channel assembly optically connected with the optical switch for transmitting the multiplexed signal stream;
    a reflector reflecting the multiplexed signal stream received from the first channel;
    an optical extractor having a thin film filter receiving the multiplexed signal stream reflected from the reflector, and dividing the stream into a signal to be extracted and remaining signals, the remaining signals being directed to the reflector from the filter, and
    a multiplexer optically connected with a second channel assembly and combining the remaining signals with an added signal into a multiplexed signal stream.

2. The optical add-drop multiplexer according to claim 1, wherein the first and second channel assemblies each have a plurality of optical fibers and corresponding collimating lenses respectively optically connected with the optical fibers.

3. The optical add-drop multiplexer according to claim 1, wherein the reflector is a concave mirror reflector.

4. The optical add-drop multiplexer according to claim 1, wherein the reflector comprises a glass body having a paraboloid surface, and a high reflective layer applied on the paraboloid surface.

5. A method of extracting a selected channel from a multiplexed signal stream containing a plurality of channels, the method comprising the steps of:
    providing an optical device comprising a plurality of different output ports for directing the multiplexed signal stream to a selected output port corresponding to the selected channel;
    providing a concave mirror reflector which receives and reflects the multiplexed signal stream emitted from the selected output port of the optical device;
    providing a thin film filter which receives the multiplexed signal stream reflected from the reflector and divides the signal stream into the selected channel and remaining channels; and
    directing the remaining channels of the signal stream onto the reflector.

6. The method according to claim 5, wherein the reflector comprises a glass body having a paraboloid surface, and a high reflective layer applied on the paraboloid surface.

7. An optical device comprising:
    an optical switch for switching to a channel to be extracted, the switch having an input port for inputting a multiplexed signal stream and a plurality of output ports, with one output port corresponding to the channel to be extracted and remaining output ports corresponding to other channels;
    a first channel assembly optically connected with the output ports of the optical switch and emitting the multiplexed signal stream received from said one output port;
    a reflector reflecting the multiplexed signal stream emitted from the first channel assembly; and
    an optical thin film filter receiving the multiplexed signal stream from the reflector and dividing the multiplexed signal stream into a signal corresponding to the channel to be extracted and remaining signals corresponding to the other channels, the remaining signals being directed to the reflector from the optical thin film filter.

8. The optical device according to claim 7, wherein the first channel assembly comprises a plurality of optical fibers optically connected with the optical switch, and corresponding collimating lenses respectively optically connected with the optical fibers.

9. The optical device according to claim 7, wherein the reflector is a concave minor reflector.

10. The optical device according to claim 7, wherein the reflector comprises a glass body having a paraboloid surface, and a high reflective layer applied on the paraboloid surface.

11. The optical device according to claim 7, further comprising a second channel assembly receiving the remaining signals reflected from the reflector.

12. The optical device according to claim 7, further comprising a multiplexer optically connected with the second channel assembly and combining the remaining signals with an added signal into a multiplexed signal stream.

13. A switchable add-drop multiplexer system comprising:
    an optical switch adapted to transmit a light from a same source to different positions;
    a first channel assembly connected to said optical switch to provide a plurality of parallel light paths corresponding to said different positions;
    an optical device configured to converge said parallel light paths into a focal point; and
    an optical extractor positioned at said focal point for dropping a signal of a desired wavelength, the extractor having a filter formed thereon.

14. The multiplexer according to claim 13, further including a second channel assembly opposite to said first channel assembly relative to said focal point, said second channel assembly defining a plurality of parallel light paths receiving light emitted from the first channel assembly and reflected by said extractor.

15. The multiplexer according to claim 14, wherein said light received by the second channel assembly is reflected by the optical device twice, once before being reflected by the extractor and the the second time after being reflected by the extractor.

16. A method of switchably dropping different signals with different center wavelengths, comprising the steps of:
providing an optical switch defining a plurality of different output positions;
providing a first channel assembly defining a plurality of different light paths corresponding to said different output positions, respectively;
providing an extractor with a filter; and
providing means for guiding the different light paths toward said extractor at different incident angles for dropping the signals with the different center wavelengths exclusively according to the different incident angles, respectively.

17. The method according to claim 16, wherein said means for guiding further guides the different light paths which are reflected by said extractor toward a second channel assembly.

18. The method according to claim 17, wherein the light paths leaving from the first channel assembly and the light paths entering the second channel assembly are in a mutual parallel relationship.

19. The method according to claim 16, wherein said optical switch receives a single light source.

* * * * *